United States Patent
Blinn et al.

(10) Patent No.: US 8,242,917 B1
(45) Date of Patent: Aug. 14, 2012

(54) SOMATOSENSORY RECEPTORS FOR MOBILE DEVICE

(75) Inventors: Benjamin P. Blinn, Leawood, KS (US); Kenneth R. Steele, Overland Park, KS (US); Sanjay K. Sharma, Olathe, KS (US); Brita A Horton, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 480 days.

(21) Appl. No.: 12/574,254

(22) Filed: Oct. 6, 2009

(51) Int. Cl.
*G08B 17/00* (2006.01)
*G02B 7/02* (2006.01)

(52) U.S. Cl. ............... 340/589; 340/588; 340/693.6; 340/407.1; 359/820

(58) Field of Classification Search .......... 340/584, 340/586, 588, 589, 691.1, 693.5, 693.6, 693.8, 340/407.1; 358/474; 359/811, 820; 374/5, 374/29, 30; 385/14
See application file for complete search history.

(56) References Cited

U.S. PATENT DOCUMENTS

| | | | | |
|---|---|---|---|---|
| 4,336,708 A | * | 6/1982 | Hobgood et al. | 374/5 |
| 6,462,840 B1 | * | 10/2002 | Kravtsov | 358/474 |
| 7,079,721 B2 | * | 7/2006 | Kish et al. | 385/14 |
| 7,489,838 B2 | * | 2/2009 | Kish et al. | 385/14 |
| 7,506,735 B2 | * | 3/2009 | Kloucek et al. | 188/378 |
| 7,891,574 B1 | * | 2/2011 | Kennedy et al. | 236/91 F |
| 8,064,151 B2 | * | 11/2011 | Jansen et al. | 359/820 |
| 2009/0139248 A1 | * | 6/2009 | Crumlin et al. | 62/62 |

OTHER PUBLICATIONS

Chouvardas, V.G., et al., "Tactile Displays: a short overview and recent developments," Oct. 2005, Developments, 5th International Conference on Technology and Automation, pp. 246-251.

Wettach, R., et al., "A Thermal Information Display for Mobile Applications," 2007, ACM International Proceedings Series, vol. 309, pp. 182-185.

Henze, N., et al., "Non-Intrusive Somatosensory Navigation Support for Blind Pedestrians," 2006, Proceedings of Eurohaptics.

* cited by examiner

*Primary Examiner* — Van T. Trieu

(57) ABSTRACT

Systems and methods for providing and/or simulating weather related information, including temperature information are provided. Weather related data can be obtained from any convenient source. A temperature indication surface can be used to match a temperature value from the weather related data. Indications can also be provided regarding wind speed and general weather condition corresponding to the weather related data.

20 Claims, 8 Drawing Sheets

SOMATOSENSORY RECEPTORS FOR MOBILE DEVICE

BACKGROUND

In many locations, weather related information is a topic of daily interest. Whether a person is preparing for a business trip, getting ready for school, or making vacation plans, weather information can have a notable impact on the clothing and activities selected. Weather information is often delivered in the form of a numerical reading, such as a temperature in Fahrenheit or Celsius.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, various aspects of this invention relate to providing a user with weather related information, including simulating temperature information. Weather related data can be obtained from any convenient source. A temperature indication surface can be used to match a temperature value from the weather related data. Indications can also be provided regarding wind speed and general weather condition corresponding to the weather related data.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
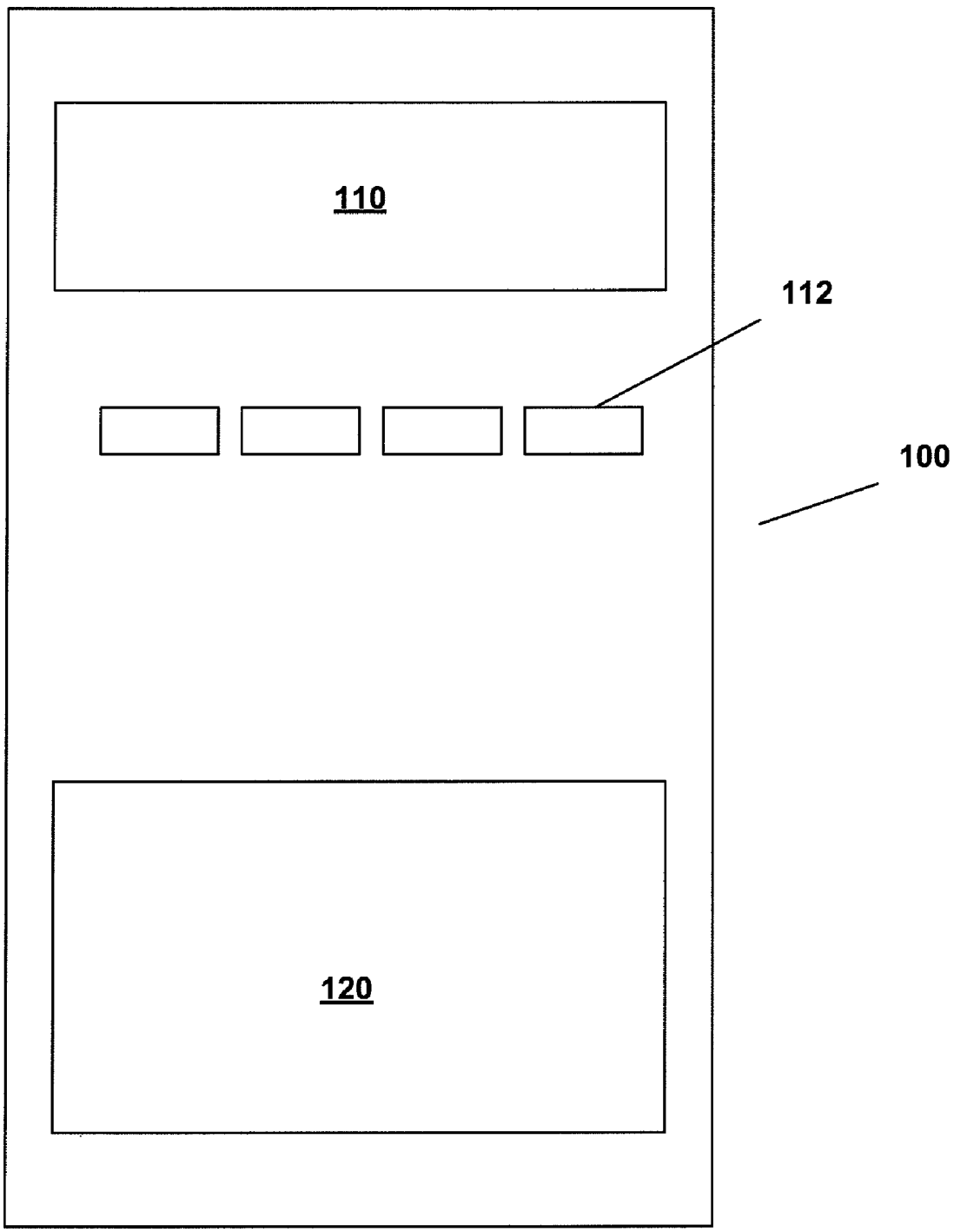
FIGS. 1 to 3 schematically depict a device in accordance with an embodiment of the invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Overview

In various embodiments, systems and methods are provided for allowing a user to better understand a past, current or future weather condition. In such embodiments, the system and methods can provide a user a sensation of the actual temperature indicated in a weather measurement or forecast. Rather than providing just a number for the temperature, a surface is provided that matches the temperature value. This permits the user to "feel" the temperature, thus providing the user with better insight as to how the user will perceive the temperature. Additional information can also be provided, such as information regarding wind conditions or the general nature of a weather condition.

Traditional methods of providing temperature information typically involve reporting a numerical value for the temperature. While the Fahrenheit and Celsius temperature scales provide a consistent basis for comparison, numerical values do not indicate how an individual will react to a temperature conditions. For example, some people feel chilly when the temperature is 68° F. (20° C.), while others may find that temperature excellent for wearing short sleeves.

This problem can be overcome by providing a user with a device that can generate a temperature for the user to feel. For example, a temperature indication surface can be provided that is designed to heat or cool to match a selected temperature. Alternatively, air can be heated or cooled to the selected temperature and exhausted from the device using a fan. The selected temperature can be a current temperature, a future prediction, or a past temperature reading. Preferably, the temperature indication surface can provide a surface area of roughly the size of a hand or palm. This can provide a better indication to a user of how a temperature "feels", as opposed to having a fingertip sized surface.

In other embodiments, other somatosensory information can be provided about aspects of a weather condition. For example, a general indication of wind conditions can be provided by using fans to indicate wind speed. A series of tactile surfaces can also be used to provide an overall weather impression.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

USB Universal Serial Bus

In various embodiments described below, reference will be made to matching a temperature value, such as by modifying the temperature of a temperature indication surface to match a value. Matching a temperature value is defined as providing a temperature value that is within 1° F. of the desired value. In other embodiments, the temperature of a temperature indication surface can be adjusted to be as close to a desired temperature as possible. In such embodiments, the temperature can be adjusted to differ from a desired temperature by 2° F. or less, or 1° F. or less, or 0.5° F. or less.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. In an embodiment, the computer readable media can comprise tangible computer-readable media.

Temperature Simulation

In various embodiments, temperature information can be provided to a user via a temperature indication surface. A temperature indication surface allows a user to feel the temperature, as opposed to viewing a number for the temperature. Preferably, the temperature information provided by the temperature indication surface can match any location based temperature. Alternatively, the indication surface can have limits on the range of temperatures that are indicated. For example, the temperature indication surface (or other apparatus for providing the temperature) can have a lower temperature limit, so that the lowest temperature provided by the indication surface is at least −20° F., or at least −10° F., or at least 0° F. In another example, the temperature indication surface can have an upper temperature limit of 115° F. or less, or 105° F. or less, or 95° F. or less.

A temperature indication surface provides temperature information to a user by heating or cooling to simulate an indicated temperature. Upon receiving a request from a user, a temperature value is obtained for use. The temperature of the indication surface is then modified to match the obtained value. Alternatively, the temperature of the indication surface can be adjusted to be as close as possible to the obtained value.

The temperature of the indication surface can be modified in any convenient manner, such as by using heating and cooling coils adjacent to the surface. In many embodiments, modifying the temperature of the indication surface will require a period of time. Preferably, the user can be provided with an alert when the indication surface has reached the desired temperature. The alert can be a visual indicator in a display, an audible alert, a vibration of a device, or another convenient alert. When the indication surface achieves the desired temperature, the temperature can be maintained for a temperature maintenance period. The temperature maintenance period can be at least about 10 seconds, or at least about 30 seconds, or at least about 1 minute. The time period can optionally be selected by the user. Preferably, the end of the temperature maintenance period can be indicated by another alert, such as another audible alert or the removal of the indicator in the display.

The temperature information can be obtained from any convenient source. The temperature information can be obtained from a network and/or wireless source of temperature data. Potential sources of temperature information can include a web site or other network location, an application program interface offered by a service provider, or a database that is accessible to the device. The temperature information can be information that is maintained by the user, by the manufacturer of the device, or by a third party provider of information. The temperature can represent a past temperature, a current temperature, or a temperature prediction. The temperature data can correspond to any geographic location for which such data is available. For example, the geographic location can correspond to a user provided location such as a zip code, a city and state, a public location, or even a specification of latitude and longitude. Alternatively, the geographic location can be detected by the device, such as by a global positioning system.

In another embodiment, the temperature data can represent a series of temperatures. The series of temperatures can be any convenient series desired by a user, such as the temperature at a given location over an 8 hour period, the low temperature at a given location for a series of days, or an average high temperature for a selected group of cities that a user will be visiting during a month. In such an embodiment, the temperatures can be indicated consecutively by the surface. For example, the temperature of the indication surface can be modified to match the first temperature in the series. The user can be alerted when the indication surface reaches the temperature. The indication surface can then maintain the temperature for a temperature maintenance period. At the end of the temperature maintenance period, the temperature of the indication surface can be modified to match the next temperature in the series. Another alert can be provided when the indication surface matches the next temperature.

In yet another embodiment, a device can include multiple temperature indication surfaces. The multiple surfaces can be used to provide separate areas for generating temperatures that are hotter than the ambient conditions and cooler than ambient conditions. Alternatively, the separate areas can provide hotter and cooler temperatures relative to a fixed temperature. Still another option is to provide multiple areas that can both heat and cool a surface, thus allowing multiple temperatures to be provided at the same time. This could be used, for example, to provide a comparison between the predicted high temperatures in two different cities.

In still another embodiment, a user can be provided with temperature information by using fans to blow air that is at the selected temperature. In such an embodiment, the heating and cooling elements (such as coils) can be used to modify the temperature of air within a chamber. A fan can then be used to expel the air, allowing a user to feel the air temperature. One optional advantage of this type of embodiment is that humidity information can also be provided. Humidity is another example of a weather characteristic that is difficult to appreciate just from seeing a number on a screen. When temperature information is provided by heating or cooling air, the water vapor content of the air can be modified so that the user can also feel the impact of the humidity level.

General Weather Information

In some embodiments, another type of qualitative information that can be provided is wind speed. Wind speed can be indicated in a non-visual manner using fans to blow air. Unlike temperature, the full range of possible wind speed conditions is not suitable for reproduction. Instead, fans can be used to provide a qualitative assessment of wind speed. For example, wind speeds of less than 5 miles per hour can correspond to having the fans off. A wind speed of 5 miles per hour to 15 miles per hour can correspond to having the fans on a low setting, while wind speeds above 15 miles per hour can correspond to a high setting. Of course, more or fewer fan speed settings can be used, and the wind speed range corresponding to each setting can be any convenient range.

In still other embodiments, a general indication of weather conditions can be provided via tactile information. For example, various types of weather conditions can be associated with different tactile plates. One plate could be smooth (possibly associated with a clear, pleasant condition), another plate could have a sandpaper feel (possibly associated with severe weather, such as thunderstorms or hail), while still another plate could have a soft, pliable texture (possibly associated with snowfall). Based on a tactile plate, a user could immediately obtain a general description of the type of weather at a particular location at a particular time. In addition to different types of surfaces, additional tactile information can be conveyed by using repeating patterns on the tactile surface. Regular space filling shapes such as triangles, rectangles, hexagons, etc. can be separated by grooves or ridges, allowing a repeating pattern or other pattern to form on a surface. Such patterns could be used so that the shapes indicate one aspect of the weather condition, the size of the shapes indicates a second aspect, and the texture within the shapes could indicate another aspect.

Examples of general weather information could be expressing a cold, windy, wet day by using small (cold) hexagons (wet) with a rough (windy) interior, versus a hot still day by using large (hot) triangles (dry) with a smooth (no wind) interior. Other combinations of tactile information for expressing a weather condition will be apparent to those of skill in the art. More generally, various features of a tactile plate can be used to provide weather information along various axes, including temperature, chance of precipitation, amount of wind, likelihood of severe weather, and others. Note that each axis can have multiple values represented on the plates. For example, the temperature axis might include 4 different categories (hot, warm, cool, cold). As another example, the likelihood of severe weather could be provided as a single plate, so that when the severe weather plate is provided, the user understands that a dangerous weather condition is being simulated. In such a situation, indicating information such as the temperature or chance of precipitation of the general weather condition can be less important than alerting the user to the severity of the condition.

The tactile information can be provided in any convenient manner. One option for providing the tactile information is to have series of plates containing various tactile sensations. Each plate can be associated with a general weather condition. The plates could be stored in a rack, possibly in a manner similar to a compact disc changer. When a weather condition is requested, the appropriate plate can be selected and placed on a support. The support can then be moved to the surface of the device in order to expose the plate to the user. Optionally, the plate can be exposed by moving a sliding cover on the apparatus. In another embodiment, a plurality of plates can be mounted on and/or form the edge of a rotatable wheel- or disc-like structure. The rotatable disc could have a number of surfaces around the perimeter, such as 6, 8, 12, or any other convenient number. When a weather condition is requested, the wheel could rotate so that the appropriate plate is aligned with a location where a user can touch the plate, thereby exposing the plate to the user. In still another embodiment, a round disc can be used, with the tactile plates corresponding to different portions of the circumference of the disc. Optionally, providing the plate to the user could involve moving the plate toward the surface of a device once the wheel is rotated into place.

Device Characteristics

In an embodiment, the above features can be provided by a weather information device. Preferably, the weather information device can be a portable device, such as a handheld device. In some embodiments, the device can perform other functions, such as handling phone calls, managing calendar information and contacts, etc. In other embodiments, a portable weather information device can be a separate device that communicates with another computing and/or phone device. Communication with another computing device can be via a cable connected to a USB port, by wireless communication via an infrared interface or radio interface, or by another convenient method.

The weather information device can include several features. One feature is a mechanism for providing temperature information. In some embodiments, the temperature information is provided using a temperature indication surface. The temperature indication surface can have any convenient shape. The temperature indication surface can be a part of the housing of a device, or a surface exposed through the housing. The surface can occupy one side of the device, or the surface can wrap around multiple sides of the device to provide additional surface area for a user to feel. In embodiments where the device has a circular or elliptical shape, the indication surface could be a continuous surface that wraps around the circumference of the device.

A device can include multiple indication surfaces. For example, one surface can be dedicated to providing temperatures that require a heating element, while another surface provides temperatures that require a cooling element. In an embodiment, a "hot" indication surface and a "cold" indication surface can be provided at opposite ends of a device. Alternatively, multiple indication surfaces can be used to provide more than one temperature at the same time.

Each temperature indication surface is operably coupled to structures for heating and/or cooling of the indication surface. For example, each indication surface can be coupled to one or more heating coils and/or cooling coils. Alternatively, any other convenient type of heating element and/or cooling element can be used. Examples of heating elements can generally include resistive heating elements and microwave heating element. Examples of cooling elements can generally include typical evaporator/compressor type cooling elements and Peltier or thermoelectric type cooling elements. Note that the cooling elements can optionally include a separate heat sink that is not associated with a temperature indication surface. Preferably, a surface can be coupled with both a heating and cooling element, so that the same surface can provide both warmer and cooler temperatures. In some embodiments, the temperature indication surface can have the form of a ball or balloon like surface that is filled with a fluid, such as a liquid or air. In such an embodiment, adjusting the temperature of the indication surface can be accomplished indirectly by adjusting the temperature of the internal fluid.

The heating and cooling elements can be controlled by a processor. The processor can receive temperature data from a variety of sources. In some embodiments, the processor can be a general purpose processor that performs a variety of functions, including allowing a user to access information via a network. In such embodiments, a user can instruct the processor to retrieve weather data from a network site. In other embodiments, the processor can be programmed to receive weather data from a source that provides the data in a useful format. For example, a weather information device according to the invention can be connected to another computing device such as a cell phone or laptop computer. The connection between the other computing device and the weather information device can be by using a cable (such as by using a USB cable and ports), by using wireless radios, by using infrared signals, or by another convenient method.

Depending on the embodiment, a user can control the operation of the weather information device using input features associated with the simulation device, using input features associated with another computing device in communication with the simulation device, or a combination thereof. In an embodiment, the weather information device can be a standalone device. Such a device can include a processor and programming to allow a user to request simulation of a temperature and/or provide additional weather information. The device would then retrieve the necessary data for simulating the requested weather condition and provide the temperature, wind speed, general weather condition, and/or other weather information. In such an embodiment, the weather information device could include a keypad (such as a cell phone style keypad) or even a standard "qwerty" keyboard, to facilitate user control of the device.

Alternatively, the weather information device can rely on another computing device for control and input/output features. In an embodiment, a weather information device can be in communication with another computing device such as a cell phone or a laptop computer. The communication can be wired or wireless. Optionally, an application can be installed on the other computing device that facilitates communication with and control over the weather information device. The other computing device can then be used to retrieve weather data and provide the weather data to the weather simulation device in a suitable format. Optionally, the other computing device can format the weather data prior to passing the information to the weather simulation device. The weather information device can then provide the weather condition based on the data provided by the other computing device. Any additional user input and/or feedback is provided via the other computing device. In such an embodiment, the weather information device could include few or no input buttons, as input is handled by another device. The output features could also be limited to features such as status lights for indicating that the weather information device had power or that the information device was communicating with the other computing device.

In still another embodiment, a combination of the weather information device and another computing device can be used for communication and control. For example, the other computing device can be used to select a weather condition to simulate and retrieve data from a network location. The weather data can be forwarded to the weather information device. A user could then use controls provided on the weather information device. For example, the user could use controls associated with the weather information device to select one or more weather conditions and/or locations for which data was recently provided to the simulation device. The information device can also indicate when a temperature indication surface has reached a desired temperature, or when the appropriate tactile surface for general weather information has been exposed. In such an embodiment, the input features of the simulation device could include a full keypad. Alternatively, since at least some input can be handled by another computing device, a smaller number of control buttons could be appropriate.

The current status of the temperature indication surface can be provided by one or more types of information. In some embodiments, the weather information device can include a display area for displaying text. The display area can include various types of information, including the current temperature of an indication surface, the desired temperature, whether the indication surface has reached the desired temperature, and/or a description of what time and location corresponds to temperature being simulated. In embodiments where the weather information device works in conjunction with another computing device, at least some information can be displayed by the another computing device. In such embodiments, the weather information device can include other types of information regarding the current status of an indication surface. For example, status lights can be used to show whether the indication surface has reached a desired temperature. Alternatively, the device can include a speaker to provide an audible signal when the indication surface changes status (such as reaching a desired temperature). Still another option is to include a mechanism for allowing the device to vibrate as an alert.

In some embodiments, a weather information device can use airflow to provide information. For example, fans can be included in the device to provide various amounts of airflow external to the device. A processor in the device can be used to control the fans, based on the weather condition being simulated.

In still other embodiments, tactile plates can be used to provide a general description of a weather condition. The weather information device can include a plurality of tactile plates. Each plate can be associated with a different general weather condition, as described above.

The various tactile plates can be provided as an edge or edges of one or more wheel- or disc-like structures. In an embodiment, one or more round disc structures can be used, with the tactile surfaces corresponding to various portions of the circumference (edge) of the disc. Alternatively, the plates can be provided as a series of faces forming the edges of the disc, leading to a shape that can be similar to a polyhedron, such as a hexagonal shape, an octagonal shape, etc.

In embodiments where the tactile plates are provided as portions of the circumference of a round disc, or as plates on a polyhedral disc, an edge of the disc can be continuously exposed through the housing for the user to feel. Alternatively, the disc can be retractable, with a sliding plate to protect the interior of the housing when the disc is not exposed. In such an embodiment, the spindle (or other mechanism) for allowing the disc to rotate can be mounted on a lever arm or a rail, so that the disc can be translated into and out of the position where the user can feel a tactile surface.

Examples

FIG. 1 shows an example of a device according to an embodiment of the invention. In the embodiment shown in FIG. 1, a top view of a weather information device with a roughly rectangular housing 100 is depicted. The top view of the device shows a display 110, several input buttons 112, and a temperature indication surface 120. The display 110 can provide information regarding the weather condition being simulated, including but not limited to the location and/or the time corresponding to the weather data. Input buttons 112 can represent any convenient type of input key or button. The buttons 112 can be part of a keypad, buttons that have specific functions related to operation of the device, buttons that have functions indicated in display 110, or another type of button. Although the embodiment in FIG. 1 shows buttons, other types of user input features could be used, such as switches, knobs, or heat sensitive or touch screen style input areas.

Figure 2:
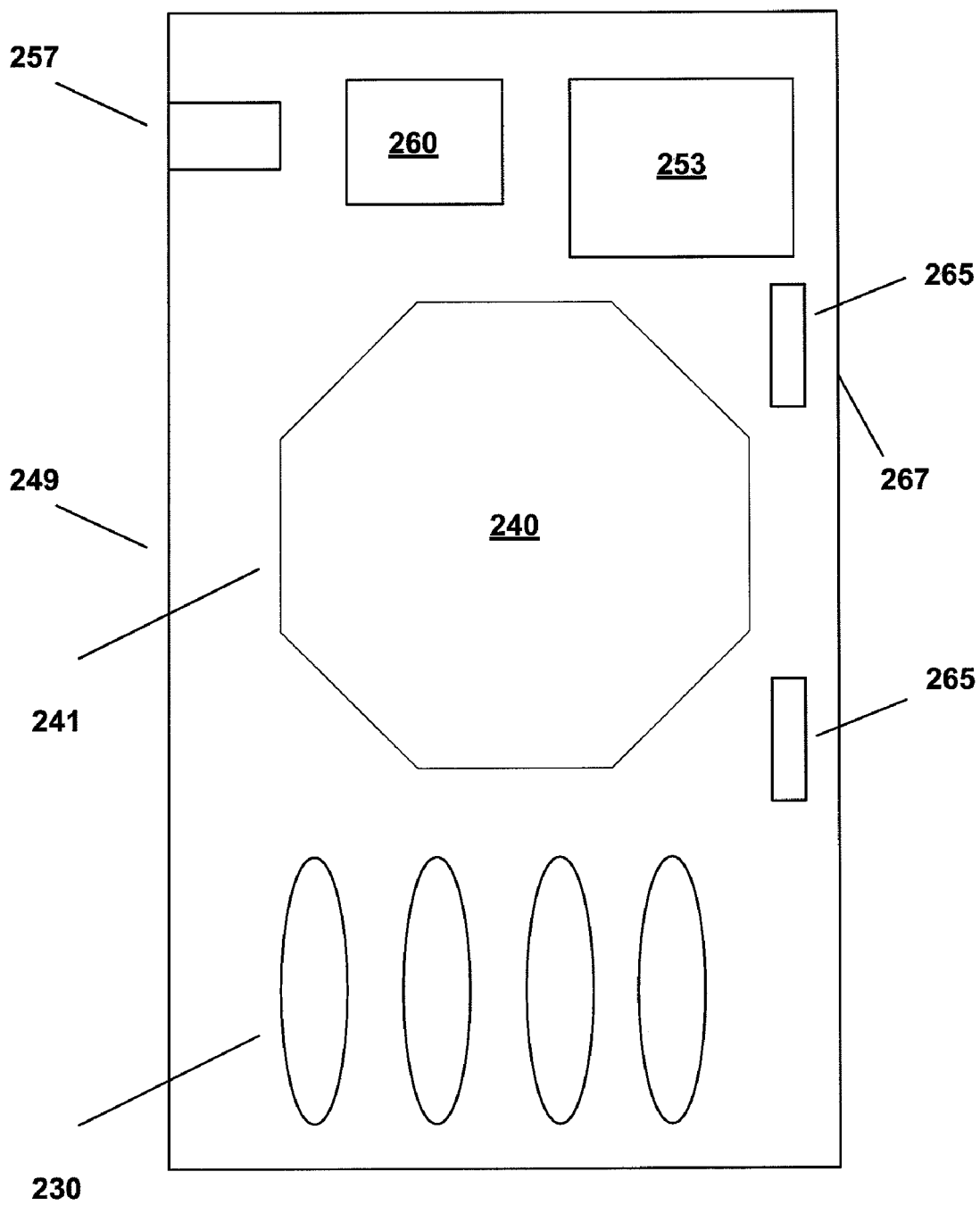

FIG. 2 shows a view of the interior of the same embodiment of a weather information device. In FIG. 2, components in the weather information device that reside below the top layer of housing 100 are shown. The components include heating and cooling coils 230. Heating and cooling coils 230 are coupled to the temperature indication surface to allow modification of the temperature of the surface. Tactile disk 240 includes a plurality of tactile plates 241. The tactile disk 240 can be rotated to position a desired plate 241 in alignment with opening 249 for exposure to a user. For providing wind speed information, fans 265 can propel air through an aperture such as aperture 267. The device can communicate with other computing devices via a connection port 257. Connection port 257 is in communicatively connected to processor 260. Processor 260 processes weather data received via connection port 257 and controls the various components to provide weather simulation information. Power for the device is provided by battery 253.

Figure 3:
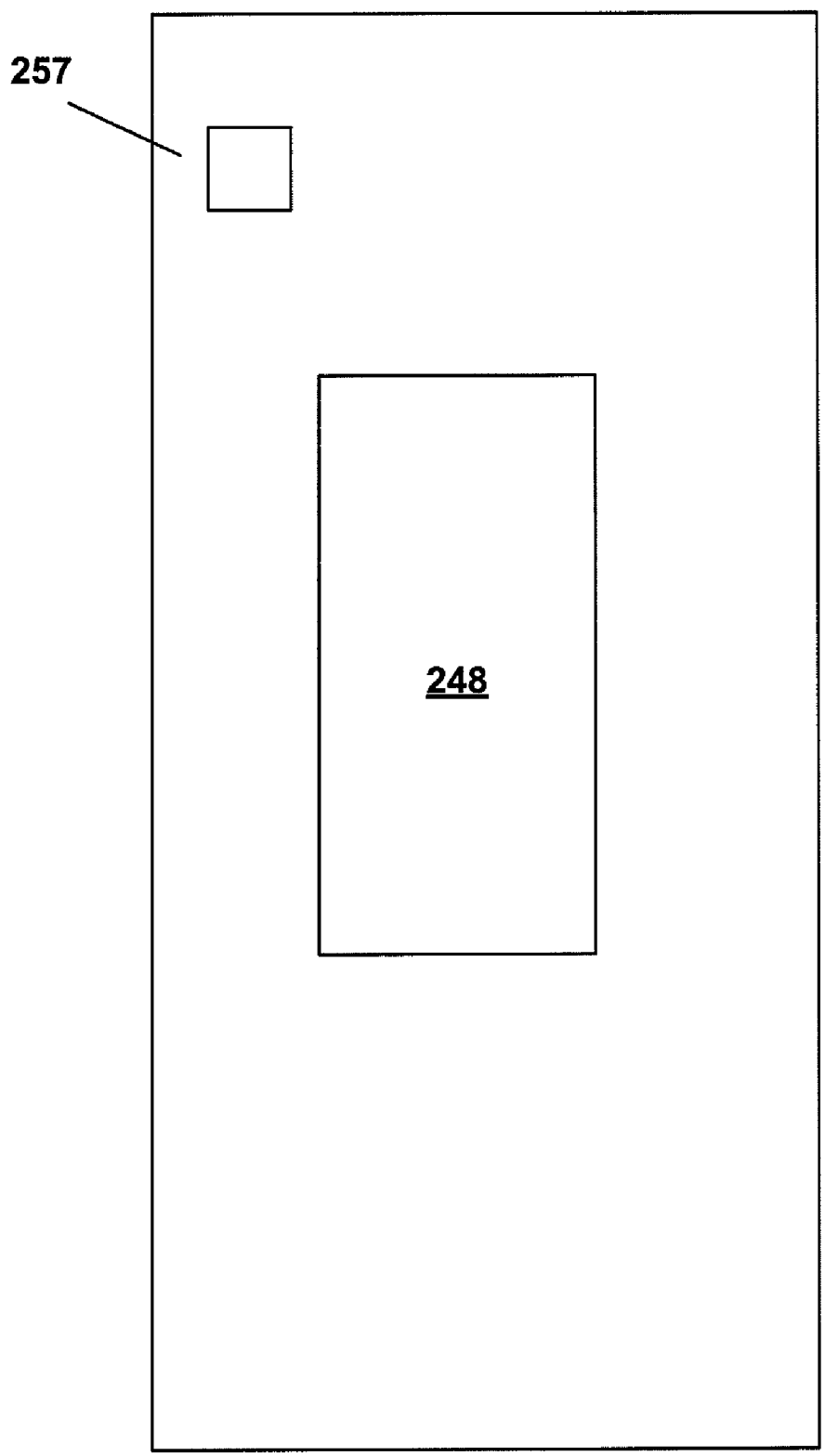

FIG. 3 provides a side view of the device embodiment shown in FIGS. 1 and 2. The side view in FIG. 3 shows the connection port 257. FIG. 3 also shows a opening 248 for providing a tactile plate to a user. A sliding cover (not shown) may optionally be used to cover the opening when a plate is not being provided to a user.

Figure 4:
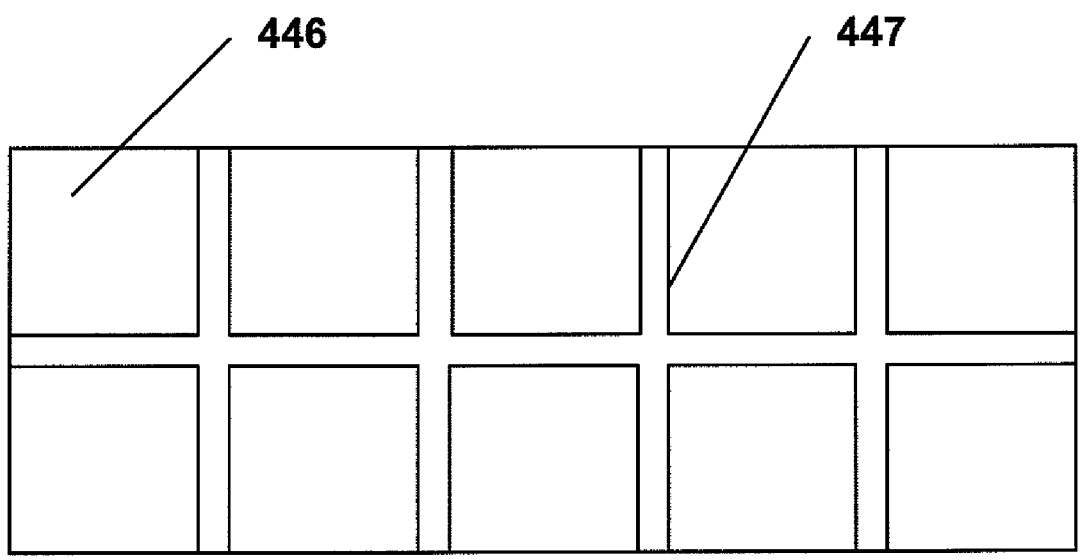
FIG. 4 schematically shows a tactile plate according to an embodiment of the invention.

FIG. 4 shows an example of a tactile plate according to an embodiment of the invention. In FIG. 4, the tactile plate includes a series of shapes 446 (squares in this embodiment) separated by grooves 447. The shapes can also provide a texture, as described above. For each tactile plate, the shapes on the plate can be varied as well as the size of the shape and the texture provided.

Figure 5A:
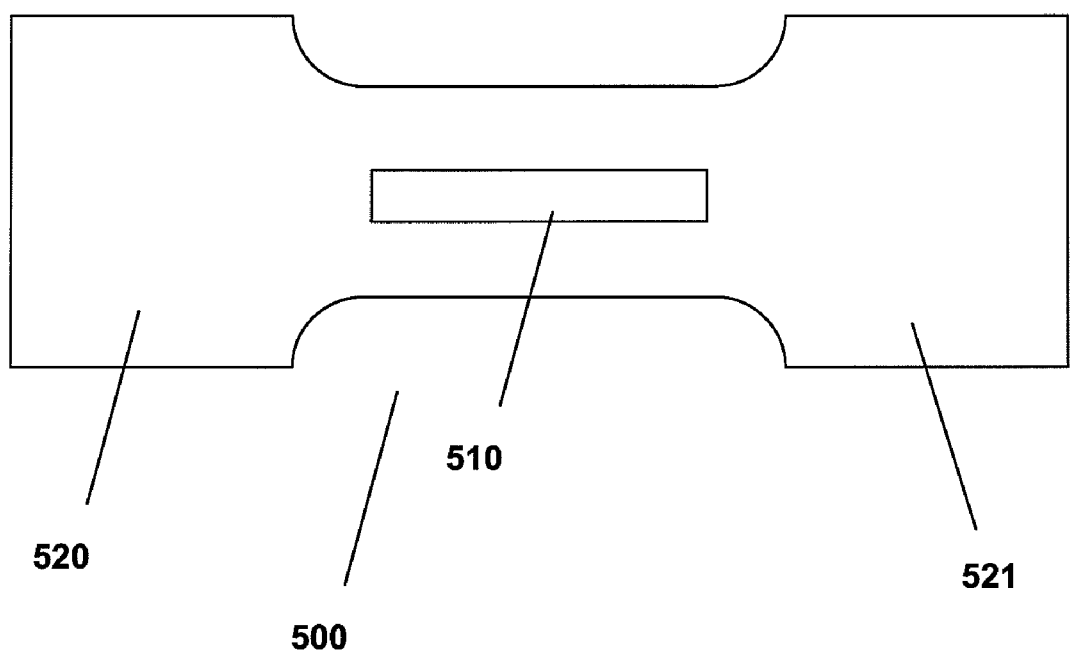
FIGS. 5A and 5B schematically depict a device in accordance with another embodiment of the invention.
Figure 5B:
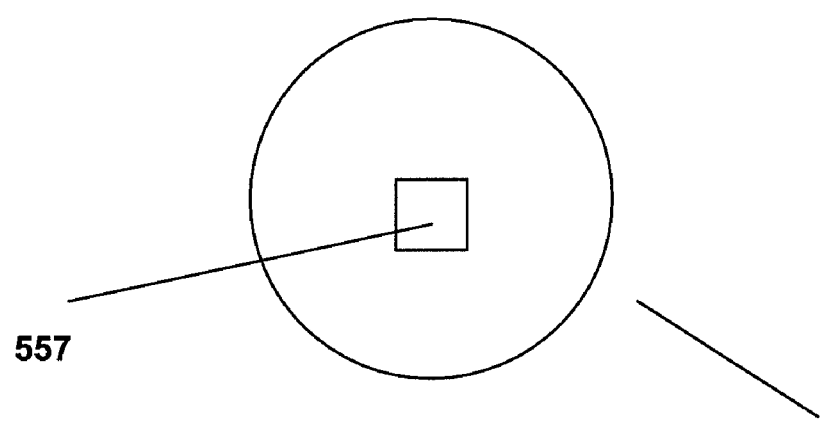

FIGS. 5A and 5B show a device according to another embodiment of the invention. In the embodiment shown in FIGS. 5A and 5B, two temperature indication surfaces 520 and 521 are provided, with one at each end of the device housing 500. As shown in FIG. 5B, the overall device profile is round. This provides a user with a convenient shape for grasping the temperature indication surface. In the embodiment shown in FIG. 5A, indication surfaces 520 and 521 are physically separated, to facilitate allowing the device to provide two separate temperature values at the same time. For example, indication surface 520 could provide the low temperature for a day at a given location while indication surface 521 could provide the high temperature. Since the ambient temperature the device will be used in is unknown, and may be unrelated to the requested temperatures, both of the indication surfaces 520 and 521 preferably have a heating mechanism and cooling mechanism associated with them. As an example, if the device is used indoors during the winter, both the high temperature and the low temperature may be below the current indoor temperature value. The embodiment shown in FIG. 5A also includes a display 510 for providing information about the weather data being simulated, including but not limited to the location and/or the time corresponding to the weather data. FIG. 5B provides an end view of the device, showing the overall circular profile of the depicted embodiment. Of course, other convenient shapes for the device could be selected. In FIG. 5B, a communication port 557 is included on the end surface. The communication port 557 can be, for example, a USB port. In alternative embodiments, the device can communicate using a wireless interface.

Figure 6:
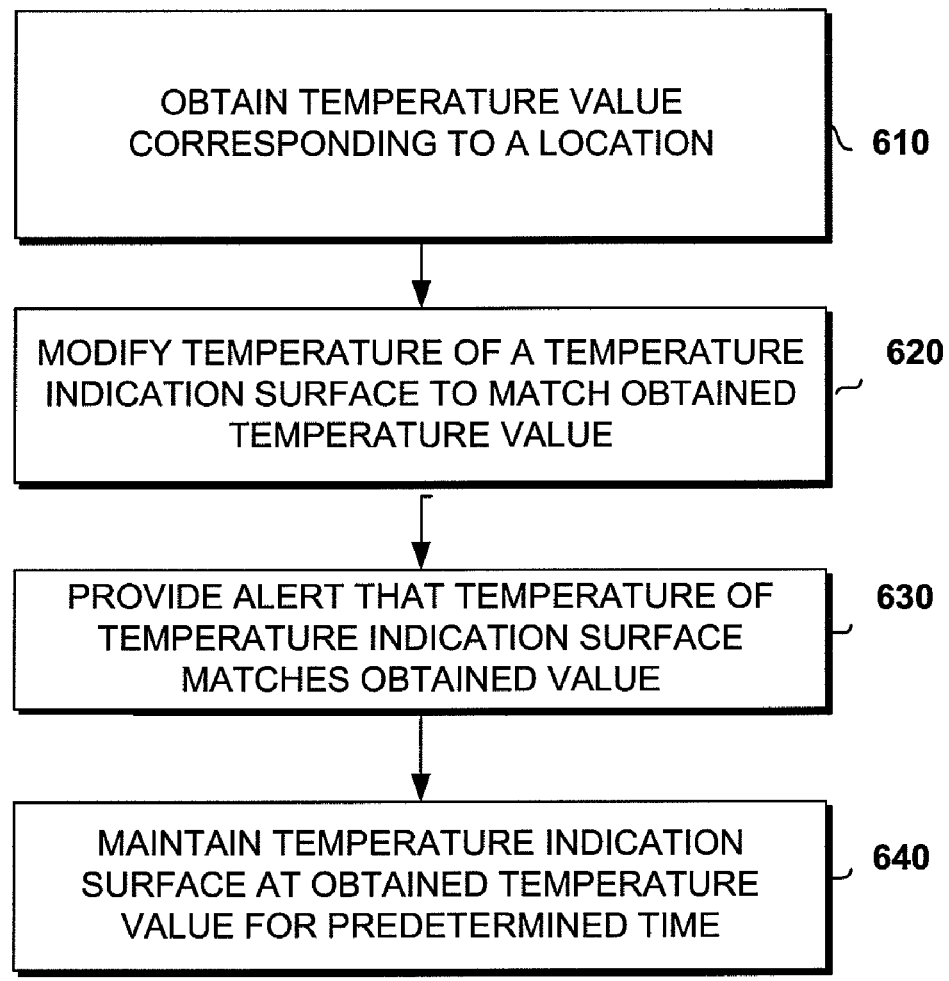
FIG. 6 provides a flow chart corresponding to a method in accordance with an embodiment of the invention.

FIG. 6 shows an example of a method according to an embodiment of the invention. In FIG. 6, a temperature value corresponding to a location is obtained 610. The temperature of a temperature indication surface is modified 620 to match the obtained temperature value. An alert is then provided 630 to inform a user that the temperature indication surface matches the obtained temperature value. The temperature of the temperature indication surface is then maintained 640 for a predetermined period of time.

Figure 7:
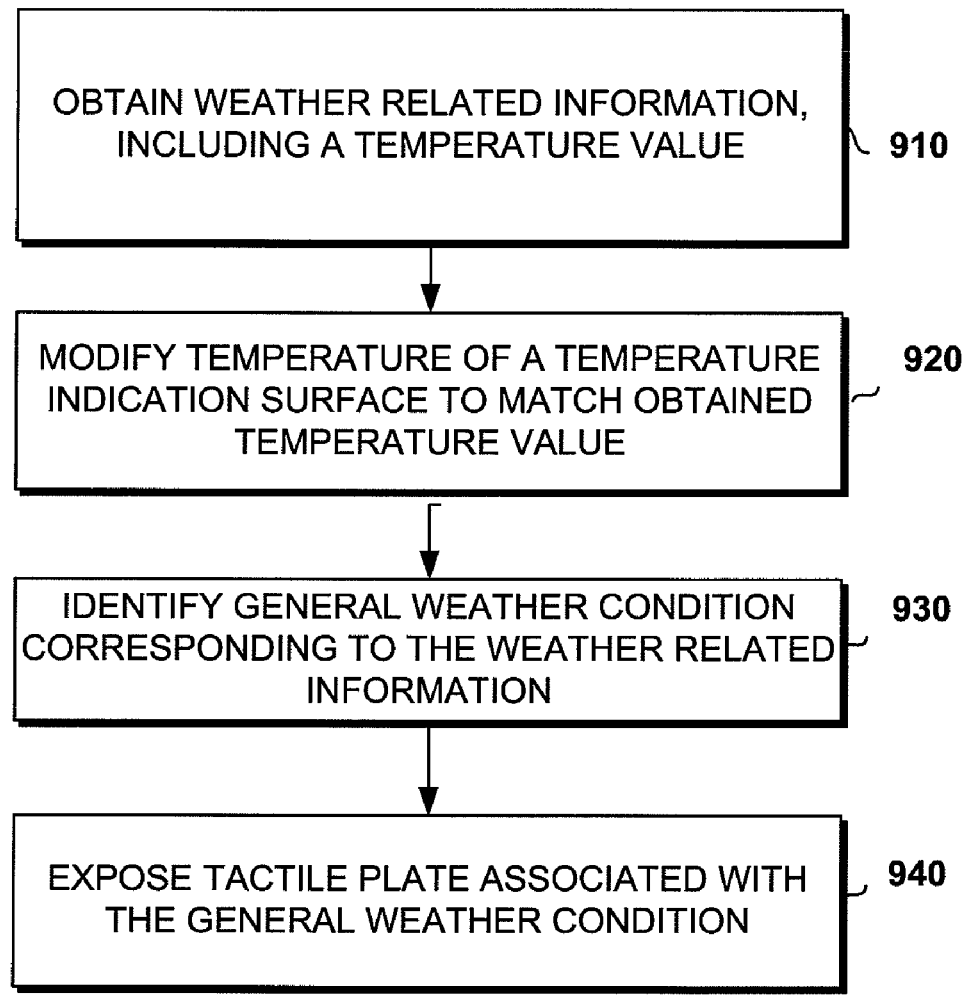
FIG. 7 provides a flow chart corresponding to another method in accordance with an embodiment of the invention.

FIG. 7 provides an example of a method according to another embodiment of the invention. In FIG. 7, weather related information is obtained 710, including a temperature value. The temperature of a temperature indication surface is modified 720 to match the obtained temperature value. A general weather condition corresponding to the weather related information is also identified 730. A tactile plate associated with the general weather condition is then exposed 740.

Figure 8:
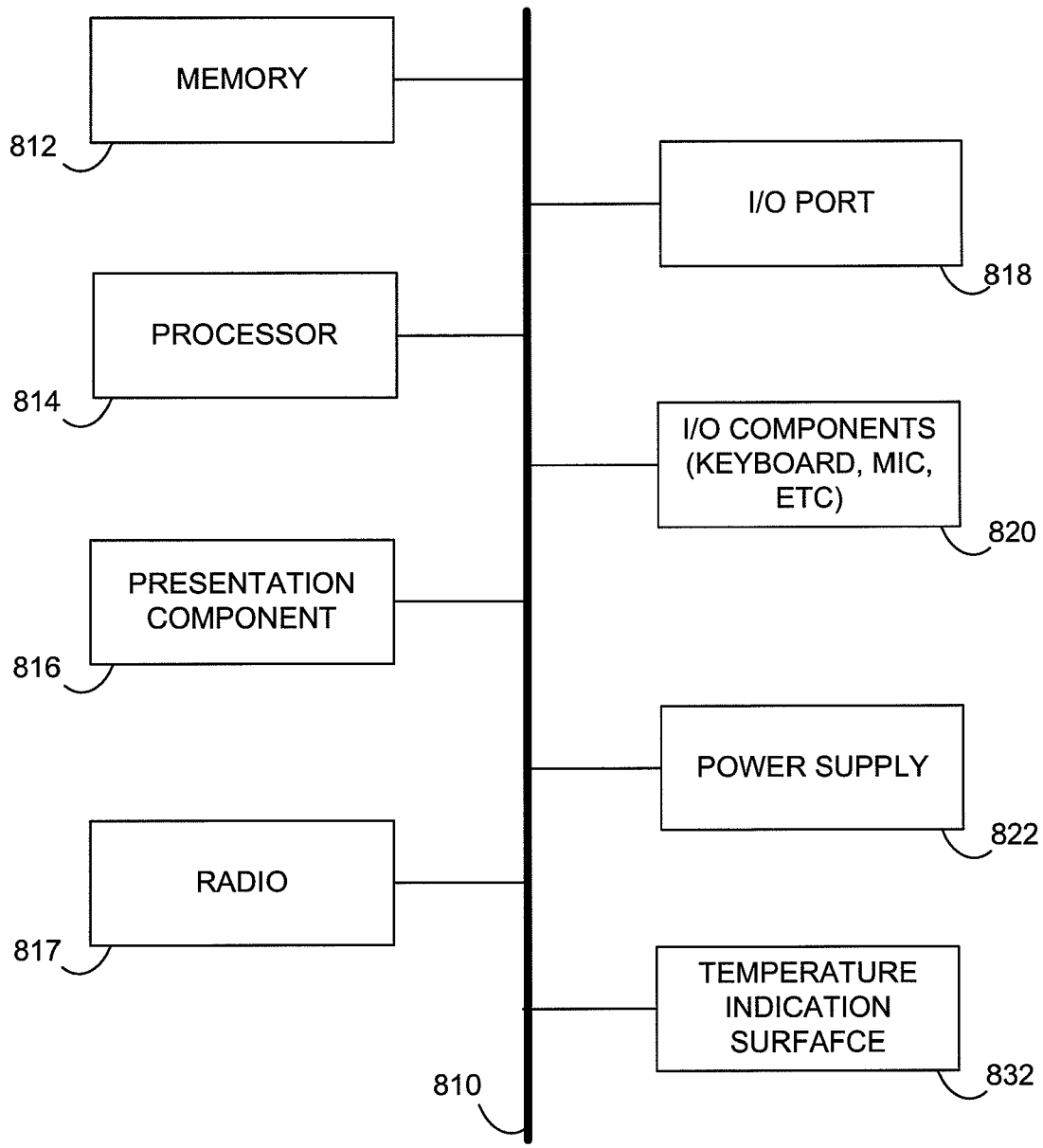
FIG. 8 schematically shows a computing device environment suitable for performing an embodiment of the invention.

In various embodiments, one or more computing devices may be involved in providing a device and/or a method according to the invention. The weather information device itself can fully or partially include various aspects of a computing device. Additionally, a weather information device can work in conjunction with other computing devices. In FIG. 8, a block diagram of an illustrative computing device is provided and referenced generally by the numeral 800. The illustrative device may be a mobile device, or a laptop or desktop computer, a weather information device, or another computing device. Although some components are shown in the singular, they may be plural. For example, computing device 800 might include multiple processors or multiple radios, etc. As illustratively shown, computing device 800 includes a bus 810 that directly or indirectly couples various components together including memory 812, a processor 814, a presentation component 816, a radio 817, input/output ports 818, input/output components 820, and a power supply 822. Although not present in all computing devices, the embodiment shown in FIG. 8 includes an optional temperature indication surface 832, as would be found in a weather information device according to the invention.

Memory 812 might take the form of one or more of the aforementioned media. Thus, we will not elaborate more here, only to say that memory component 812 can include any type of medium that is capable of storing information in a manner readable by a computing device. Processor 814 might actually be multiple processors that receive instructions and process them accordingly. Presentation component 816 includes the likes of a display, a speaker, as well as other components that can present information (such as a lamp (LED), or even lighted keyboards).

Radio 817 represents a radio that facilitates communication with a wireless telecommunications network. Illustrative wireless telecommunications technologies include CDMA, GPRS, TDMA, GSM, and the like. In some embodiments, radio 817 might also facilitate other types of wireless communications including Wi-Fi communications and GIS communications.

Input/output port 818 might take on a variety of forms. Illustrative input/output ports include a USB jack, stereo jack, infrared port, proprietary communications ports, and the like. Input/output components 820 include items such as keyboards, microphones, touch screens, and any other item usable to directly or indirectly input data into mobile device 810. Power supply 822 includes items such as batteries, fuel cells, or any other component that can act as a power source to power mobile device 810.

Additional Embodiments

In an embodiment, a device for providing weather related information is provided. The device includes a housing and a temperature indication surfaces. The device also includes a heating element configured to modify a temperature of the temperature indication surface. The device further includes a cooling element configured to modify the temperature of the temperature indication surface. Additionally, the device includes a processor coupled to the at least one heating element and the at least one cooling element, the processor being capable of receiving temperature information corresponding to a location.

In another embodiment, a method for simulating a temperature value is provided. The method includes obtaining a temperature value corresponding to a location. The temperature of a temperature indication surface is modified to match the obtained temperature value. An alert is then provided that the temperature of the temperature indication surface matches the obtained temperature value. The temperature indication surface is maintained at the obtained temperature value for a predetermined time In still another embodiment, a method for providing weather related information is provided. The method includes obtaining weather related information, including a temperature value. The temperature of a temperature indication surface is modified to match the obtained temperature value. A general weather condition corresponding to the weather related information is also identified. A tactile plate associated with the general weather condition is then exposed.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A device for providing weather related information, comprising:
   a housing;
   a temperature indication surface;
   a heating element configured to modify a temperature of the temperature indication surface;
   a cooling element configured to modify the temperature of the temperature indication surface; and
   a processor coupled to the heating element and the cooling element, the processor being capable of receiving temperature information corresponding to a location.

2. The device of claim 1, the device comprising at least two temperature indication surfaces.

3. The device of claim 1, wherein the heating element is a heating coil, a resistive heating element, or a microwave based heating element.

4. The device of claim 1, wherein the cooling element is a cooling coil or a thermoelectric cooling element.

5. The device of claim 1, further comprising one or more fans, the fans being coupled to the processor and the processor being capable of receiving wind speed information, wherein the housing includes openings for air flow.

6. The device of claim 1, further comprising:
   a plurality of tactile surface plates; and
   a surface plate transport for positioning a tactile surface plate in a information delivery position that is detectable through the housing, the surface plate transport being coupled to the processor and the processor being capable of receiving general weather information.

7. The device of claim 6, further comprising:
   a movable cover surface located on the housing, the movable cover surface having at least one position that permits access to a tactile surface plate in the information delivery position.

8. The device of claim 6, further comprising a tactile disk, wherein at least one edge of the tactile disk comprises the plurality of tactile surface plates.

9. The device of claim 6, wherein the plurality of tactile surface plates comprise a pattern of shapes having textured surfaces, the shapes being separated by grooves or ridges.

10. A method for simulating a temperature value, comprising:
    obtaining a temperature value corresponding to a location;
    modifying a temperature of a temperature indication surface to match the obtained temperature value;
    providing an alert that the temperature of the temperature indication surface matches the obtained temperature value; and
    maintaining the temperature indication surface at the obtained temperature value for a predetermined time.

11. The method of claim 10, wherein obtaining a temperature value comprises obtaining a plurality of temperature values, the plurality of temperature values forming a series.

12. The method of claim 11, wherein the series is a chronological based series of temperatures, a location based series of temperatures, or a combination thereof.

13. The method of claim 11, further comprising
    modifying the temperature of the temperature indication surface to match the series of temperature values; and
    indicating each match between a temperature of the temperature indication surface and a next temperature in the series of temperature values.

14. The method of claim 10, wherein the obtained temperature value is a previous temperature value, a current temperature value, or a predicted temperature value.

15. The method of claim 10, wherein indicating that the temperature of the temperature indication surface matches the obtained temperature value includes one or more of an audible indication, a visual indication, and a tactile indication.

16. One or more tangible computer-readable media having computer-executable instructions embodied thereon that, when executed, perform a method for providing weather related information, the method comprising:
    obtaining weather related information, including a temperature value;
    modifying a temperature of a temperature indication surface to match the obtained temperature value;
    identifying a general weather condition corresponding to the weather related information; and
    exposing a tactile plate associated with the general weather condition.

17. The computer readable media of claim 16, wherein exposing a tactile plate comprises:
    selecting the tactile plate corresponding to the general weather condition;
    moving a movable portion of a housing to provide an opening;
    aligning the tactile plate with the provided opening.

18. The computer readable media of claim 16, wherein exposing a tactile plate comprises rotating a disk having the tactile plate as an edge.

19. The computer readable media of claim 16, the method further comprising creating an air flow corresponding to a wind speed in the obtained weather related information.

20. The computer readable media of claim 16, wherein the weather related information comprises a plurality of temperature and a plurality of general weather conditions.

* * * * *